US008287774B2

(12) United States Patent
Hwang

(10) Patent No.: US 8,287,774 B2
(45) Date of Patent: Oct. 16, 2012

(54) ELECTROCHROMIC PANI FILMS AND PROCESS THEREOF

(75) Inventor: Tae-Jin Hwang, Incheon (KR)

(73) Assignee: Korea Institute of Industrial Technology, Chungcheongnam-Do (KR)

( * ) Notice: Subject to any disclaimer, the term of this patent is extended or adjusted under 35 U.S.C. 154(b) by 12 days.

(21) Appl. No.: 11/919,263

(22) PCT Filed: Oct. 15, 2007

(86) PCT No.: PCT/KR2007/005039

§ 371 (c)(1),
(2), (4) Date: Apr. 5, 2010

(87) PCT Pub. No.: WO2009/028758

PCT Pub. Date: Mar. 5, 2009

(65) Prior Publication Data

US 2010/0200818 A1 Aug. 12, 2010

(30) Foreign Application Priority Data

Aug. 29, 2007 (KR) ........................ 10-2007-0087130

(51) Int. Cl.
*C09K 9/00* (2006.01)
*G02F 1/00* (2006.01)
*G02F 1/153* (2006.01)

(52) U.S. Cl. ........ 252/583; 252/500; 359/273; 359/275; 430/62; 430/132; 430/631

(58) Field of Classification Search .................. 252/583, 252/500; 430/62, 132, 631; 359/273, 275
See application file for complete search history.

(56) References Cited

U.S. PATENT DOCUMENTS

| | | | | |
|---|---|---|---|---|
| 4,526,706 | A * | 7/1985 | Upson et al. | 252/500 |
| 2003/0087107 | A1 * | 5/2003 | Varaprasad et al. | 428/432 |

FOREIGN PATENT DOCUMENTS

| | | | |
|---|---|---|---|
| KR | 2002-0009726 | * | 2/2002 |
| KR | 2004-0058513 | * | 7/2006 |

OTHER PUBLICATIONS

Taejin Hwang, Silica / Polyaniline Composite Nanoparticle Produced in an Inverse Microemulsion Solution for the Electrochromic Applications, Ph.D. Dissertation, Incheon 2007.*

Yanhou Geng, Ji Li, Zaicheng Sun, Xiabin Jing, Fosong Wang, Polymerization of aniline in an aqueous system containing organic solvents, Synthetic Metals 96, 1998, 1-5, © 1998 Published by Elsevier Science S.A. All rights reserved.*

* cited by examiner

*Primary Examiner* — Bijan Ahvazi
(74) *Attorney, Agent, or Firm* — Patents+TMS, P.C.

(57) ABSTRACT

A method of manufacturing an electrochromic polyaniline thin film changeable in color in dependency upon the supply of electricity is provided. The method comprises the steps of polymerizing aniline monomer into polyaniline polymer, separating the polyaniline polymer, liquefying the separated polyaniline polymer into a dispersing solution using a mixed surfactant, and dissolving an UV curing adhesive in the dispersing solution, whereby the polyaniline thin film has the ductility and improved adhesion force for an electric substrate, so that it is applicable to development of a flexible display and as a next generation hi-tech material.

11 Claims, 3 Drawing Sheets

Diverse Type Conductive Polymer

ELECTROCHROMIC PANI FILMS AND PROCESS THEREOF

TECHNICAL FIELD

The present invention relates to an electrochromic thin film, capable of changing color according to the supply of electricity, and more particularly to a method of fabricating a thin film having improved electrochromic and adhesive properties, by polymerizing aniline monomer into polyaniline, separating the polyaniline using a centrifuge, preparing a dispersing solution by mixing the separated polyaniline in surfactant and tetrahydrofuran, and dissolving a UV curing adhesive in the dispersing solution.

BACKGROUND ART

An electrochromic element is a material that can change color according to the supply of electricity, and is applicable to a smart window or an information display device, etc.

Among them, the smart window generally uses a thin film composed of a tungsten oxide so that it shows blue color or becomes colorless according to the direction of applying voltage. That is, if negative voltage is applied, the smart window has deep blue color to reduce the transmission of incident light. If applied with positive voltage, the smart window becomes colorless so that more light can be incident through the window. Herein, the time to change color takes from a millisecond to a few minutes, and light transparency is generally 1 to 30%, which is greatly different from that of transparent glass ranging from 40 to 80%. Since the building using the smart window is thermally insulated, it has excellent ability of saving energy, which is consumed in heating, air conditioning and lighting.

The key point of the electrochromic element for use in the smart window is the fact that the color has to be easily changed according to the supply of electricity. Further, the electrochromic element should have the flexibility so that it can be responsive to the bending operation thereof. Such a property is an important factor required for attaching the electrochromic element to the surface of glass, plastic or metal, or for fabricating the same into a thin film. As the electrochromic element, a polymer material is proper for the reasons that while it has poor electric conductivity than metal, it can be fabricated through compounding, it is lighter than metal, and it has ductility.

Referring to FIG. 1, the monomer constituting the polymer material may have electric conductivity. The electrically conductive monomer has a double bond therein. The double bond consists of π-bond and σ-bond, in which the π-bond is accompanied with many electrons, so that certain electrons can migrate in accordance with the n-bond. Accordingly, the n-bond can provide the polymer with electrical characteristic. Attention had been riveted, as the electrochromic element, to polyacetylene, that has the double bond while having such a molecule structure, because it has the electric conductivity similar to Cu (approximately $10^6$S/cm). However, due to its oxidizing characteristic in air, it was fatally destitute of stability so that its value was admitted as only academic achievement. Then, naturally, the study for electrically conductive polymer was focused upon various candidate polymer materials capable of securing physical, chemical stabilities, and attention was drawn to polyaniline, that have been known since 140 years ago.

Among polymer materials, the polyaniline is easy to compound, and is stable under room temperature and atmospheric pressure. Further, the aniline, the unit of the polyaniline, includes a benzene ring, and may have an oxidizing state in multi-stage due to the double bond and the resonance structure of the benzene ring. Furthermore, based on respective oxidizing states, the electric conductivity can be widely varied from a nonconductor to a conductor, so that it has the electrochromic characteristic according to the oxidizing state.

For the reason above, the polyaniline has been widely applied to various fields, such as electrochromic material, electronic material, thin film, lithography, catalyst, sensor, nano fiber (particle), thin film transistor and super capacitor. Further, the polyaniline replaced an existing inorganic metal material with an organic material, so that it had the usefulness as a next generation high-tech material such as the development of a flexible display.

Nevertheless of such an advantage, however, the polyaniline had a problem in that it was hardly applicable to an electrochromic element or a display device, which would require the ductility, because it was transformed into excessively stable material after being compounded. Further, it is difficult to fabricate the polyaniline in a thin film because the compounded polyaniline is hardly dissolved in most of organic solvents as well as is very brittle and easily broken. In order to overcome the above problems and fabricate the polyaniline in a thin film to thereby use it as an electrochromic element, a study has been started to manufacture a polyaniline thin film.

As a method of manufacturing polyaniline in a thin film, there were chemical polymerization, electrochemical polymerization, dispersion polymerization, and copolymerization. The chemical polymerization is conducted such that aniline monomer and a polymerization agent (generally, ammonium persulfate, $(NH_4)_2S_2O_8$)) are mixed into an aqueous solution, that is adjusted to acidity, to start polymerization, and then a substrate is immersed in the solution to thereby polymerize it as well as to form, on the surface thereof, a polyaniline thin film. This method is the simplest method among the methods of manufacturing the polyaniline thin film.

However, the thin film obtained from this method is not easy to adjust the thickness or the adhesion force thereof. Further, the chemical polymerization is not easy to adjust the characteristic of the thin film as compared to the other methods. Moreover, since only a part of the polyaniline participates in forming the thin film, most of polyaniline remains in the solution. The remaining polyaniline cannot be used any more in the formation of the thin film, so that too much polyaniline is used wastefully rather than that used in the formation of the thin film. This is problematic. Furthermore, the remaining polyaniline is carcinogen that is harmful to the health of a human being.

Another method for the formation of the thin film is the electrochemical polymerization. The basic process of this method is the same as that of the chemical polymerization. However, in this method, a certain electric potential is applied in order to control the characteristic of the thin film, so that this method can advantageously control the adhesion force, the density, the electrical property, and others of the polyaniline thin film. However, this method also has the same problem as the chemical polymerization.

Still another method for the formation of the polyaniline thin film is the dispersion polymerization. The key point of this method is that while once the polyaniline is prepared by the polymerization, it is uniformly dispersed in form of very small particles in a solution. When the polyaniline is dispersed as such, it has an effect as if it is dissolved. That is, such an effect is similar to the formation of the polyaniline solution, so that the dispersing solution is applied to various types of substrates to thereby fabricate a thin film. Further, using this method, a thin film can be fabricated relatively stably. However, while the polyaniline thin film applicable to an electrochromic element needs to maintain sufficient adhesion force for increase in lifetime and reliability of the element, the thin film obtained by this method has a problem in that the adhesion force is insufficient so that the thin film is easily detached from the element.

Yet still another method for the formation of the polyaniline thin film is the copolymerization of the polyaniline. That is, polymer and copolymer that are easily dissolved in organic solvent are formed so that the polyaniline that is not dissolved is to be dissolved. Using such a method, the polyaniline thin film can be easily obtained. However, nevertheless the formation of the polyaniline thin film is ultimately for using the electric property of the polyaniline, if another type of polymer (most case, such polymer is greatly different in electrical property from the polyaniline) is mixed therein, a problem is caused in that the electrical property of the polyaniline thin film is deteriorated or lost.

DISCLOSURE OF INVENTION

Technical Problem

The present invention has been made to solve the foregoing problems of the prior art, and therefore an object of the present invention is to provide an electrochromic polyaniline thin film in which aniline monomer is polymerized into polyaniline and the polyaniline polymer is prepared as a dispersing solution so as to reduce the amount of the polyaniline, which does not participate in forming the polyaniline thin film, but remains and is finally discarded, and to prevent the polyaniline from being hardly formed with a thin film due to its brittleness, and in which an UV curing adhesive is added in the dispersing solution so as to solve the problem in that the dispersing solution is deteriorated in its adhesion force, thereby providing ductility, improving the adhesion force, increasing lifetime, and providing an excellent electrochromic characteristic making the color changeable in dependency upon the supply of electricity, and an electrochromic polyaniline thin film manufactured by the same method.

Technical Solution

In order to accomplish the above object of the present invention, there is provided a method of manufacturing an electrochromic polyaniline thin film changeable in color in dependency upon the supply of electricity. The method includes the steps of: polymerizing aniline monomer into polyaniline polymer; separating the polyaniline polymer; liquefying the separated polyaniline polymer into a dispersing solution using a mixed surfactant; and dissolving an UV curing adhesive in the dispersing solution.

Preferably, the separating step is conducted such that in order to improve an optical characteristic, the polymerized polyaniline polymer is rotated by a centrifuge to separate the same by particle size, and the separated polyaniline polymer is washed with ethanol.

Preferably, the dispersing solution is prepared by the procedures of drying the separated polyaniline polymer, dissolving and dispersing the dried polyaniline polymer in tetrahydrofuran, and mixing the surfactant in the solution in which the polyaniline polymer is dispersed.

Preferably, the surfactant is prepared by mixing Triton X-100 with NP-5, namely poly(oxyethylene) 5 nonvl phenol ether, in a ratio of 1:0.32 to 0.89 by weight, and the surfactant is mixed in concentration between 4.65 wt % and 8.67 wt %.

Preferably, the drying is conducted such that the separated polyaniline polymer is dried at 60□ under vacuum for 24 hours in a vacuum oven, and the dried polyaniline polymer is dispersed in a ratio between 1.25 wt % and 5.53 wt % in tetrahydrofuran.

Preferably, the UV curing adhesive is selected from urethane-based adhesives, and the UV curing adhesive is dissolved in a concentration between 6.50 wt % and 11.07 wt %.

Preferably, the polyaniline polymer is polymerized by the procedures of dissolving hydrochloric acid in water to prepare a hydrochloric acid aqueous solution, dissolving the aniline monomer in the hydrochloric acid aqueous solution and dissolving polyvinyl alcohol therein to prepare an aniline monomer aqueous solution, and dissolving ammonium persulphate in the hydrochloric acid aqueous solution and mixing the monomer aqueous solution in the polymerized derivative aqueous solution in which the polyvinyl alcohol is dissolved.

Preferably, the hydrochloric acid aqueous solution contains the hydrochloric acid in a concentration between 0.035M and 0.670M, and the monomer aqueous solution contains the aniline monomer in a concentration between 0.06M and 0.15M.

Preferably, the polyaniline polymer is polymerized by mixing the monomer aqueous solution and the polymerized derivative aqueous solution in a ratio of 1:0.67 to 1.54 by weight, the polyvinyl alcohol has a concentration between 5.8 wt % and 26.5 wt %.

More preferably, the polyaniline thin film having excellent electrochromic property and adhesion force is manufactured by any one of the above methods.

Advantageous Effects

As set forth before, in the method of manufacturing the polyaniline thin film changeable in color in dependency upon the supply of electricity according to the present invention, the aniline monomer is polymerized into the polyaniline polymer, and the polymer is then prepared into the dispersing solution to thereby reduce the amount of the polyaniline, that is not used for forming the thin film, but is discarded, thereby being cost-effective, and also to prevent the polyaniline, that is unnecessary and harmful to a human body, from being generated, thereby avoiding environmental pollution. Further, the polyaniline is separated by particle size to prepare the uniformly dispersed solution so that the polyaniline thin film is formed in a constant thickness, thereby improving the optical characteristic. Further, the thin film is manufactured using the UV curing adhesive so that it is stably bonded to an electric substrate, thereby reducing the time to change in color in dependency upon the supply of electricity. Furthermore, the polyaniline thin film manufactured according to the present invention has an increased adhesion force for the substrate to thereby increase the lifetime of the electrochromic element.

DESCRIPTION OF DRAWINGS

The above and other objects, features and other advantages of the present invention will be more clearly understood from the following detailed description taken in conjunction with the accompanying drawings, in which.

BEST MODE

The present invention will now be described more fully hereinafter with reference to the accompanying drawings, in which exemplary embodiments thereof are shown.

Figure 1:
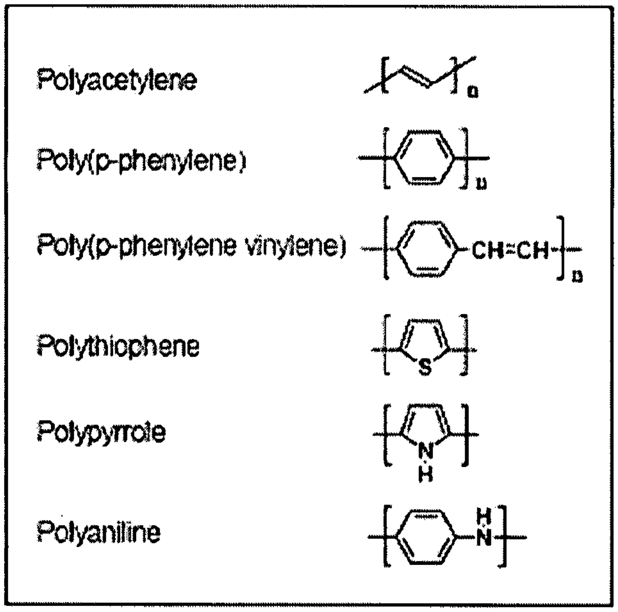
FIG. 1 illustrates a polymer material having electric conductivity.
Figure 2:
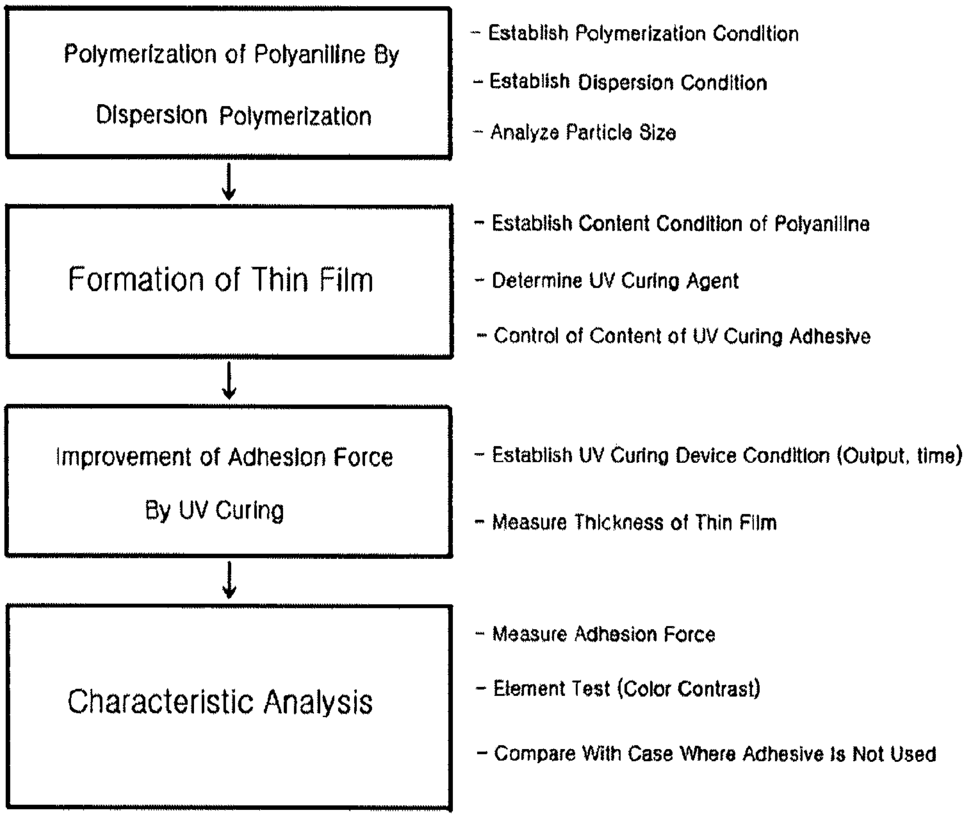
FIG. 2 is a flow diagram illustrating a process of manufacturing a polyaniline thin film having improved electrochromic property and adhesion force according to the present invention.
Figure 3:
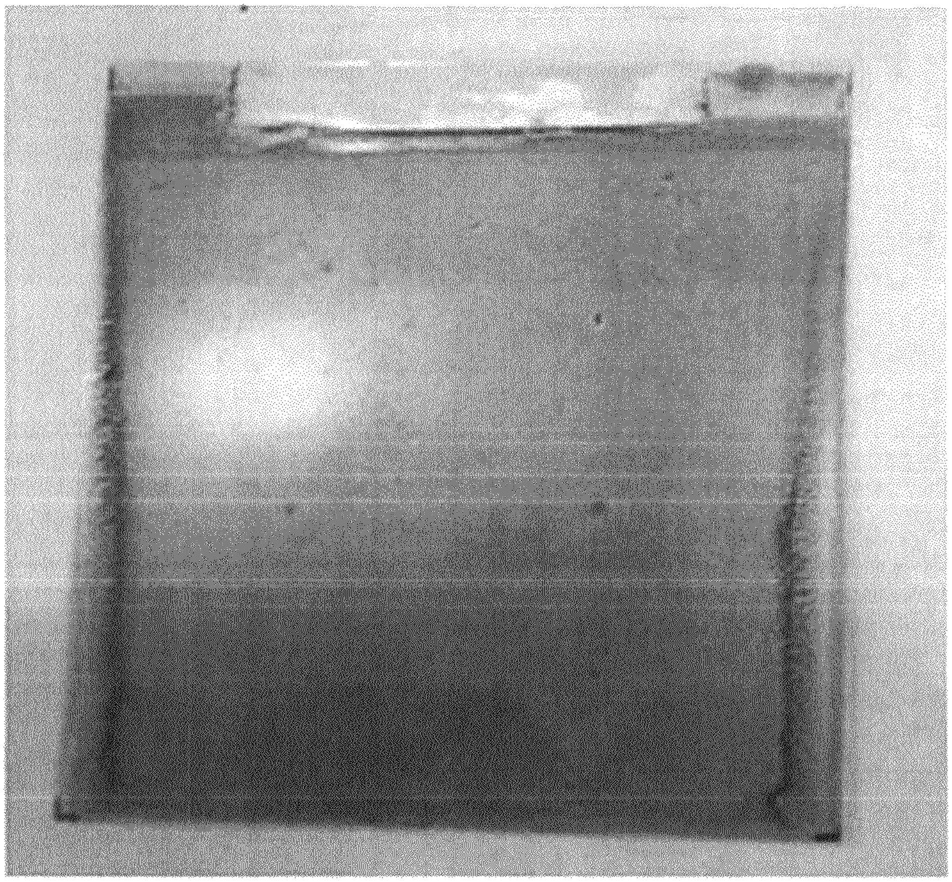
FIG. 3 is a view illustrating the polyaniline thin film manufactured according to an embodiment of the present invention.
Figure 4:
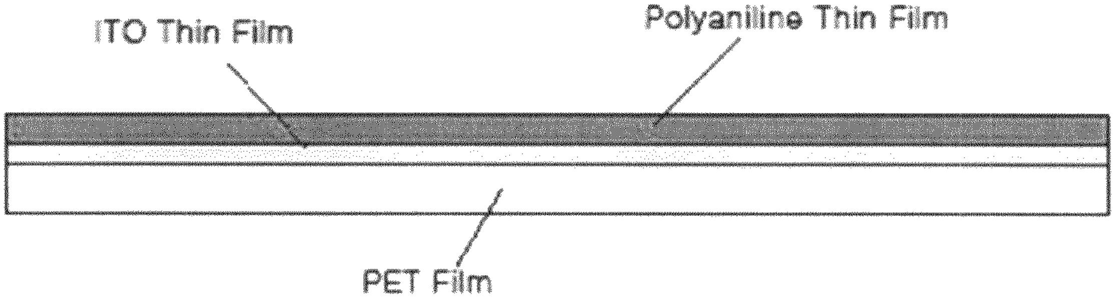
FIG. 4 is a cross-sectional view illustrating the polyaniline thin film manufactured according to an embodiment of the present invention.
Figure 5:
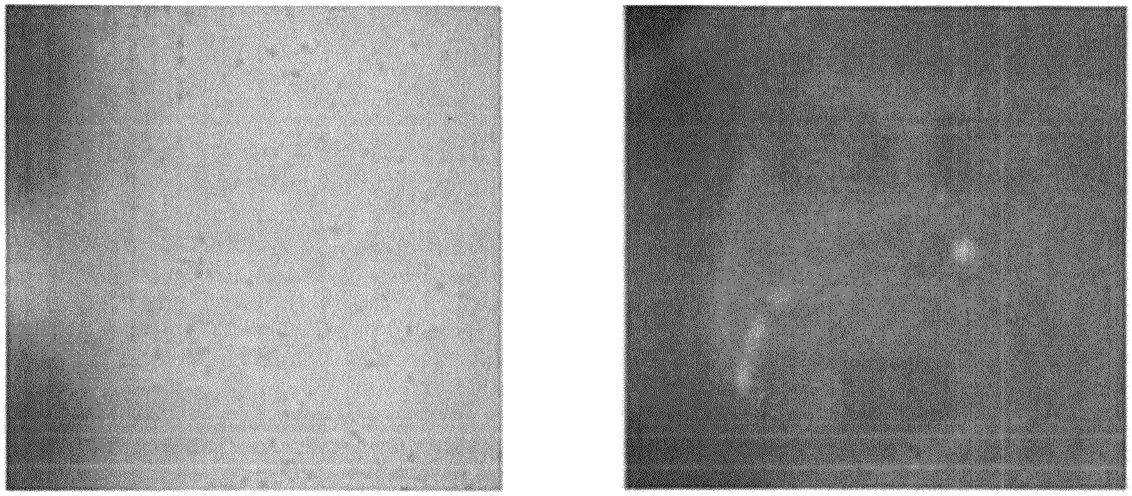
FIG. 5 is a view illustrating the polyaniline thin film manufactured according to the present invention, the color of which is changed according to the supply of electricity.

FIG. 1 illustrates a polymer material having electric conductivity, FIG. 2 is a flow diagram illustrating a process of manufacturing a polyaniline thin film having improved electrochromic property and adhesion force according to the present invention, FIG. 3 is a view illustrating the polyaniline thin film manufactured according to an embodiment of the present invention, FIG. 4 is a cross-sectional view illustrating the polyaniline thin film manufactured according to an embodiment of the present invention, and FIG. 5 is a view illustrating the polyaniline thin film manufactured according to the present invention, the color of which is changed according to the supply of electricity.

Referring to FIG. 1, the polyaniline has a benzene ring in its monomer, which provides electric conductivity. Further, the polyaniline may have multi-stage oxidizing states due to the double bond and the resonance structure of the benzene ring. Furthermore, based on respective oxidizing states, the electric conductivity can be widely varied from a nonconductor to a conductor, so that it has the electrochromic characteristic according to the oxidizing state. For the above reasons, the polyaniline can be used as an electrochromic element.

Referring to FIG. 2, the method of manufacturing the polyaniline thin film includes the steps of preparing a dispersing solution, mixing a curing agent or the like in the dispersing solution thereby forming a thin film, measuring the physical and chemical characteristics of the thin film formed, and determining whether or not the thin film is applicable to an electrochromic element.

For manufacturing the polyaniline thin film, the aniline monomer has to be polymerized into polyaniline polymer. To this end, aniline monomer, hydrochloric acid (HCl) aqueous solution, polyvinylalcohol, and ammonium persulphate $((NH_4)_2S_2O_8)$ are required. The aniline monomers are compounded together, increasing molecular weight, and form polymerized polyaniline in the type of a long chain. The HCl aqueous solution serves to dissolve the aniline monomer and provide the aniline monomer with the great amount of electrons in a molecule of the hydrochloric acid, thereby helping the polymerization into the polyaniline. The HCl may partially participate in the polymerization reaction to form aniline chloride. The polyvinylalcohol serves as an emulsifying agent, and the ammonium persulphate $((NH_4)_2S_2O_8)$ serves to derive the polymerization.

For polymerization of the polyaniline, two reaction vessels have to be prepared. In one vessel, HCl is dissolved in a concentration between 0.035M and 0.670M in water to prepare an HCl aqueous solution. If the HCl aqueous solution is dissolved below 0.035M, a reaction speed becomes slow, and the amount of the polyaniline obtained is small as well. On the contrary, if the HCl aqueous solution is dissolved above 0.670M, the polyaniline polymer is excessively oxidized to deteriorate the chemical stability. This reduces the lifetime of the element, which is used as an electrochromic element. Thus, the HCl aqueous solution should be dissolved within this concentration range.

In the reaction vessel in which the HCl aqueous solution is contained, the aniline monomer is dissolved in a concentration between 0.06M and 0.15M. If below 0.06M, the yield rate of polyaniline is reduced. If above 0.15M, the aniline monomer is not fully dissolved in the HCl aqueous solution, or otherwise even if the monomer is dissolved, it is difficult to control the polymerization of the polyaniline due to severe reaction upon polymerization, so that it is preferable that the aniline monomer having the above concentration range be polymerized.

In another reaction vessel, the ammonium persulphate $((NH_4)_2S_2O_8)$ i.e., a polymerization derivative, is dissolved in a concentration between 0.04M and 0.12M in the HCl aqueous solution having the concentration of 0.035M to 0.670M. The polyvinylalcohol is dissolved in a ratio of 5.8 to 26.5 wt % in the HCl solution in the vessel in which the ammonium persulphate is dissolved. The polyvinylalcohol serves to prevent the polymerized polyaniline polymer from growing to large particles, and maintain the same to be uniformly dispersed in the HCl solution. If the amount of the polyvinylalcohol is below 5.8 wt %, the dispersion is not maintained well and the particle size of the polyaniline polymer becomes larger, thereby deteriorating the optical characteristic of the polyaniline thin film. If above 26.5 wt %, the quantities of polyvinylalcohol are contained in the polymerized polyaniline polymer, thereby affecting the electrochromic property that is an inherent property of the polyaniline. Thus, it is preferable that the polyvinylalcohol be used within the above concentration range.

The first and second solutions in the first and second reaction vessels are mixed together in a ratio of 1: 0.67 to 1.54 by weight. If the ratio of the second solution is below 0.67, the speed of the polymerization reaction of the polyaniline becomes slow, so that the amount of the polymerized polyaniline is also reduced. Further, if above 1.54, the amount of the polyaniline in the mixed solution is reduced, so that the yield rate of the polyaniline is reduced. Thus, it is preferable that the two solutions of the two reaction vessels be mixed in the above ratio by weight. The two solutions are agitated at a speed of 150 rpm for 24 hours, and then are kept in that state to allow the polymerization of polyaniline to occur. It is assumed that the polymerization of polyaniline is finished after 24 hours after mixing of the solutions.

The mixed solution may include reacted polyaniline polymer, unreacted aniline monomer, HCl aqueous solution, ammonium persulphate, polyvinylalcohol and the like, so that only the polyaniline polymer has to be separated. The separating can be done using a mass analyzer or a structure analyzer, but for relatively easy separation, the separation is implemented using a centrifuge. To separate only the polyaniline polymer, the solution is rotated at 8000 rpm for 5 mins by the centrifuge. Using such a method, the polyaniline polymer can be separated by 98% or more from the polymerization-finished solution. To remove the foreign matters existing in the separated polyaniline polymer, the polymer is washed with ethanol about 5 times.

The polyaniline polymer itself is very brittle and breakable so that it cannot be easily machined. Thus, for use in an electrochromic element requiring ductility, the polymer has to be in turn polymerized in the dispersing solution to form a thin film. To prepare the dispersing solution, the polyaniline polymer is loaded in a vacuum oven of 60□, and dried under vacuum for 24 hours in order to remove the ethanol remaining in the washed polyaniline polymer.

The dried polyaniline polymer is dissolved and dispersed in tetrahydrofuran (THF) of organic solvent, and the surfactant is dissolved in this solution with the polyaniline polymer dispersed. The dispersing solution contains the dried polyaniline polymer in the range from 1.25 wt % to 5.53 wt %. The surfactant serves to stabilize the dispersion through surrounding the particles of the polyaniline polymer dispersed in tetrahydrofuran. Further, the surfactant also serves to maintain the particles of the polyaniline polymer to have a constant size. The constant-sized particles of the polyaniline polymer improve the optical characteristic of the thin film to thereby increase the optical transmitting power and the transparency of the polyaniline thin film manufactured.

In the present invention, in order to maintain the size of the polyaniline polymer in the dispersing solution to have 50 nm to 100 nm, a mixed surfactant is used which contains two or more surfactants, a length of carbon chain and an Hydrophilic-Lipophilic Balance (HLB) value of which are different from each other.

The HLB value means the degree of hydrophilicity and lipophilicity of the surfactant. The HLB value ranges between 1 indicating highest lipophilicity and 20 (40) indicating highest hydrophilicity, and the widely used surfactant generally has the value between 1 and 20. According to the HLB value, the surfactant is easily dissolved in water or organic solvent. Generally, as the HBL value increases, the solubility for water increases.

In the present invention, the surfactant is one in which Triton X-100 and NP-5, namely poly(oxyethylene) 5 nonyl phenol ether, are mixed in the ratio of 1:0.32 to 0.89 by weight. The Trion X-100 is a nonionic surfactant having a molecular formula of $C_{14}H_{22}O$ $(C_2H_4O)_n$. The Triton X-100 and the NP-5 are brand names, and are in the form of reagent. The mixed surfactant is dissolved in a concentration between 4.65 wt % and 8.67 wt % in the solution in which the polyaniline polymer is dissolved in the tetrahydrofuran (THF). If the concentration is below 4.65 wt %, the dispersion is not carried out well. Further, if above 8.67 wt %, the dispersing effect is degraded, and the optical characteristic of the polyaniline thin film is degraded. Moreover, since the polyaniline thin film comes to have the viscosity, and is sticky even after being dried, it is preferable that the concentration be ranged within the above range.

Next, a tetrahydrofuran is added thereto by the amount corresponding to that of the solution containing the surfactant, and an UV curing adhesive is dissolved in the resulting solution. The tetrahydrofuran solution serves to dilute the concentration of the dispersing solution of polyaniline polymer to thereby improving the electrochromic property the color of the polyaniline thin film is not changed distinctly of the resulting polyaniline thin film. This is because if the concentration of the polyaniline polymer comes to dense.

With the addition of the UV curing adhesive, a solution for manufacturing a polyaniline thin film is finally prepared, in which the concentration of the UV curing adhesive in the solution is between 6.50 wt % and 11.07 wt %. If the concentration is below 6.50 wt %, the adhesion force for an electric substrate is reduced. Further, if the concentration is above 11.07 wt %, the adhesion force is increased, but an overdose of the UV curing adhesive restricts electric contact between the polyaniline thin film and the electric substrate, thereby hindering the revelation of the electrochromic characteristic of the polyaniline thin film. Thus, it is preferable that the concentration of the UV curing adhesive be regulated within the above range.

The UV curing adhesive intensifies the adhesion force for the electric substrate so that the electric property of the polyaniline is revealed. The reason why the UV curing adhesive is preferably used among other adhesives is as follows. Since the organic polyaniline is used in the present invention, annealing is not proper to dry the polyaniline thin film. Further, with only simple drying, it is difficult to guarantee high adhesion force between the polyaniline thin film and the electric substrate. On the contrary, the UV curing adhesive can secure more intensive adhesion force relative to the simple drying, and does not require the annealing so that the polyaniline thin film can be safely protected. Further, if the polyaniline thin film containing the UV curing adhesive is not exposed to UV ray, the adhesive is not cured so the workability is advantageously improved.

The UV curing adhesive includes a urethane-based adhesive and an acryl-based adhesive, and in the present invention, the urethane-based adhesive is used. This is because the acryl-based UV curing adhesive deteriorates the flexibility after curing by nature of the structure of an organic substance, and is not proper to be used as an electrochromic element requiring ductility.

Hereinafter, the method of manufacturing the polyaniline thin film for use in en electrochromic element, and the polyaniline thin film manufactured by the method will be respectively described as the first and second embodiments. However, the scope of the present invention is not limited to the first, second embodiments.

First Embodiment

In manufacturing the polyaniline thin film having improved electrochromic characteristic and adhesion force according to the first embodiment, at first, two reaction vessels were provided for polymerizing the polyaniline. In one reaction vessel, hydrochloric acid was dissolved in a concentration of 0.25M in water to prepare a hydrochloric acid (HCl) aqueous solution, a half of which was in turn transferred to the other reaction vessel. In the one reaction vessel, aniline monomer was dissolved in a concentration of 0.11M in the HCl aqueous solution. In the other reaction vessel, ammonium persulphate $(NH_4)_2S_2O_8)$), a polymerization derivative, was dissolved in a concentration of 0.09M. Polyvinylalcohol was dissolved in a ratio of 11.3 wt % in the HCl aqueous solution with the ammonium persulphate dissolved. The solutions in the respective vessels were then mixed with each other such that the weight ratio between the first solution in the first vessel and the second solution in the second vessel was 1:1. The solutions were agitated at a speed of 150 rpm for 24 hours, and were kept at that state to thereby causing the polymerization of polyaniline. In order to separate only the polyaniline polymer, the solution was rotated at 8000 rpm for 5 min by a centrifuge. The separated polyaniline polymer was washed with ethanol about 5 times in order to remove the foreign matters in that polymer.

To prepare a dispersing solution, the polyaniline polymer was loaded in a vacuum oven of 60□, and dried under vacuum for 24 hours, so as to remove the ethanol remaining in the polyaniline polymer washed. The dried polyaniline polymer was dissolved and dispersed in tetrahydrofuran (THF) of an organic solvent, and a surfactant was dissolved in the solution with the tetrahydrofuran dispersed. The dispersing solution contains the dried polyaniline polymer by 3.82 wt %.

The mixed surfactant used in the present invention was provided by mixing Triton X-100 and NP-5, namely poly (oxyethylene) 5 nonyl phenol ether, in a weight ratio of 1:0.78. The mixed surfactant was dissolved in a concentration of 6.77 wt % in the solution in which the polyaniline polymer was dissolved in the tetrahydrofuran (THF). Then, a tetrahydrofuran solution was further added by the amount by weight corresponding to the solution containing the mixed surfactant, and an UV curing adhesive was dissolved in the resulting solution. The UV curing adhesive was added in a concentration between 6.50 wt % and 11.07 wt % in the solution. With adding the UV curing adhesive as such, a solution was finally prepared which can manufacture a polyaniline thin film.

Hereinafter, the polyaniline thin film manufactured by the method of the first embodiment will be described.

Second Embodiment

The polyaniline thin film according to the second embodiment of the present invention is provided as follows. The resulting solution for manufacturing the polyaniline thin film was coated onto a polyethylene terephthalate (PET) film, on which an Indium-Tin Oxide (ITO) thin film was applied at room temperature and atmospheric pressure, using a commercially available bar-coater. Then, the coated film was loaded in a vacuum oven of 60□ to evaporate the tetrahydrofuran (THF) remaining in the polyaniline thin film. Referring to FIG. 3, it can be known that a polyaniline thin film is finally manufactured if the dried film is loaded and cured in an UV curing device.

Referring to FIG. 4 showing the side section of the product including the polyaniline thin film manufactured, the ITO is applied on the upper face of PET, and the polyaniline thin film manufactured according to the present invention is in turn applied thereon.

The ITO is formed with an oxide of indium and tin, and generally includes $SnO_2$ of about 5 to 10 wt %. The ITO has excellent electric conductivity and band-gap of 2.5 eV or more and is transparent to visible light, so that it is generally used in a transparent electrode, such as an LCD, a PDP, an OLED or etc., which is a display driven in matrix type. In the present invention, the ITO supplies electricity to the polyaniline thin film, so that the polyaniline thin film can be changed in color in dependency upon the flow of electricity. Thus, since it is required that the polyaniline thin film be strictly adhered to the ITO in order to increase the freedom of design and the lifetime of the electrochromic element, the adhesion force of the polyaniline is an important factor for en electrochromic element.

Hereinafter, the adhesion force and the electrochromic characteristic of the polyaniline thin film according to the second embodiment will be described with reference to experimental examples 1 and 2.

Experimental Example 1

Adhesion Force of Polyaniline Thin Film

For examining the adhesion force of the polyaniline thin film, a squared scratch having a side of 1 cm was formed on the thin film in such a manner that the thin film was scratched by softly press-cutting it using a general tooling knife. Then, a Scotch tape was adhered to the squared scratch of the thin film, and was detached rapidly and perpendicularly. Then, the adhesion force was examined by comparing the damaged area with the undamaged area of the thin film.

In the case of the polyaniline thin film according to the preferred embodiment of the present invention, the damage rate was 35%. However, in the case where the polyaniline manufactured according to the electrochemical polymerization was adhered to the PET film, the damage rate was 85%. Further, in the case where the polyaniline manufactured according to the chemical polymerization was adhered to the PET film, the damage rate was 90%.

Therefore, it can be known that while the polyaniline thin film manufactured according to the prior art has poor adhesion force for the electric substrate, the polyaniline thin film including the UV curing adhesive manufactured according to the present invention has improved adhesion force.

Experimental Example 2

Electrochromic Characteristic of Polyaniline Thin Film

For examining the effect of the UV curing adhesive, which was added in manufacturing the polyaniline thin film so as to improve the adhesion force, upon the electrochromic characteristic, 4-layered element was provided to test the electrochromic characteristic.

An electrochromic element consists of a transparent conductive thin film, a working electrode or an electrochromic electrode, an electrolyte layer, a counter electrode or an ion storage layer, and a transparent conductive thin film. Such an element having all five components is called a 5-layered element, and an element excluding only the counter electrode or the ion storage layer is called a 4-layered element.

There is often the case where the counter electrode or the ion storage layer supplies or stores ions through the electrolyte layer when ions are inserted into or extracted from the working electrode or the electrochromic electrode, and at the same time, shows for itself the electrochromic characteristic. Thus, in the case of 5-layered element, upon the coloration of the working electrode or the electrochromic electrode, if the counter electrode or the ion storage layer is bleached, the change in color of the whole element can be made denser.

Thus, even though the element is constructed without the counter electrode or the ion storage layer, the color of a cell can be made changed. In the situation without the counter electrode or the ion storage layer, the change in color appears only in the working electrode or the electrochromic electrode, so that the change in color of the thin film according to the present embodiment can be observed without that of the counter electrode or the electrochromic electrode. Therefore, in the present embodiment, 4-layered element was obtained.

Referring to FIG. 5, when voltage of 0.2V is applied to the 4-layered element including the polyaniline thin film manufactured according to the preferred embodiment of the present invention, the element shows transparent dyed color, and when 1.2V is applied thereto, it shows deep blue color. These voltage values are substantially identical to those in coloring reaction for the elements including the polyaniline thin films manufactured according to the chemical polymerization and the electrochemical polymerization. As a result, it can be known that the polyaniline thin film according to the present invention shows the electrochromic characteristic substantially identical to that of the polyaniline thin film according to the prior art. That is, decoloring or coloring occurs at substantially same voltage values, and the change in color is also similar.

Therefore, the polyaniline thin film improves the adhesion force for the electric substrate with the addition of the UV curing adhesive, and nevertheless keeps the electrochromic characteristic as it is, so that the method of the present invention is very effective and useful.

Meanwhile, the polyaniline thin film according to the present invention is provided in such a manner as follows. The aniline monomer is polymerized into the polyaniline polymer using the chemical polymerization. The polymerized polyaniline polymer is then separated by the particle size of 50 nm to 100 nm using the centrifuge. With the separation of the polyaniline polymer by constant particle sizes, the polyaniline thin film has an excellent optical characteristic.

The separated polyaniline polymer is prepared as the dispersing solution, and then is dispersion-polymerized so as to improve the ductility that is required for the electrochromic element. In the dispersing solution, the polyaniline polymer in constant size is dispersed. The surfactant is used for controlling and maintaining the dispersing of the polyaniline polymer. The surfactant used in the present invention is prepared by mixing one or more surfactants, HBL values of which are different from each other.

Since such a dispersing solution contains the polyaniline polymer in a dispersed state, the brittleness of the polyaniline polymer is overcome. Further, with the addition of the UV curing adhesive in the dispersing solution, the adhesion force for the electric substrate is increased to thereby shorten the response time to change in color according to the supply of electricity. Furthermore, such an improved adhesion force of the polyaniline thin film for the electric substrate increases the reliability and the lifetime of the electrochromic element.

Therefore, the polyaniline thin film according to the present invention is excellent and effective to be used in an electrochromic element for the features set forth before. Further, the polyaniline thin film according to the present invention can be used in development of a flexible display and as a next generation hi-tech material, thereby being applicable to diverse fields.

The invention claimed is:

1. A method of manufacturing an electrochromic polyaniline thin film changeable in color in dependency upon a supply of electricity, the method comprising the steps of:

polymerizing an aniline monomer into a polyaniline polymer;

separating the polyaniline polymer;

liquefying the separated polyaniline polymer into a dispersing solution using a mixed surfactant; and dissolving a UV curing adhesive in the dispersing solution after liquefying the separated polyaniline polymer into the dispersing solution;

wherein the dispersing solution is polyaniline polymer dissolved and dispersed in tetrahydrofuran and further, wherein the concentration of the polyaniline polymer in the dispersing solution is between 1.25 wt % and 5.53 wt % before the UV curing adhesive is dissolved in the dispersing solution; and wherein the mixed surfactant contains polyoxyethylene (5) nonyl phenol ether and NP-5 in a ratio of 1:0.32 to 1:0.89 by weight.

2. The method of claim 1, further comprising the steps of:

rotating the polymerized polyaniline polymer in a centrifuge to separate the polymerized polyaniline polymer by particle size; and washing the separated polyaniline polymer with ethanol.

3. The method of claim 1, further comprising the steps of:

drying the separated polyaniline polymer;

dissolving and dispersing the dried polyaniline polymer in tetrahydrofuran; and mixing the mixed surfactant in a solution in which the polyaniline polymer is dispersed, and further dissolving the tetrahydrofuran therein.

4. The method of claim 3, wherein the step of drying is conducted such that the separated polyaniline polymer is dried under vacuum for twenty-four (24) hours in a vacuum oven.

5. The method of claim 1, wherein the concentration of the mixed surfactant in the dispersing solution is between 4.65 wt % and 8.67 wt % before the UV curing adhesive is dissolved in the dispersing solution.

6. The method of claim 1, wherein the UV curing adhesive is selected from urethane-based adhesives.

7. The method of claim 1, wherein the concentration of the UV curing adhesive in the dispersing solution is between 6.50 wt % and 11.07 wt % after the UV curing adhesive is dissolved in the dispersing solution.

8. The method of claim 1, further comprising the steps of:

dissolving hydrochloric acid in water to prepare a hydrochloric acid aqueous solution;

dissolving the aniline monomer in the hydrochloric acid aqueous solution and dissolving polyvinyl alcohol therein to prepare an aniline monomer aqueous solution; and dissolving ammonium persulphate in the hydrochloric acid aqueous solution and mixing the monomer aqueous solution in the polymerized derivative aqueous solution in which the polyvinyl alcohol is dissolved.

9. The method of claim 8, wherein the hydrochloric acid aqueous solution contains the hydrochloric acid in a concentration between 0.035M and 0.670M.

10. The method of claim 8, wherein the monomer aqueous solution contains the aniline monomer in a concentration between 0.06M and 0.15M, and the polyvinyl alcohol has a concentration between 5.8 wt % and 26.5 wt % of the polymerized derivative aqueous solution in which the polyvinyl alcohol is dissolved.

11. The method of claim 8, wherein the polyaniline polymer is polymerized by mixing the monomer aqueous solution and the polymerized derivative aqueous solution in a ratio of 1:0.67 to 1:1.54 by weight.

* * * * *